United States Patent [19]

Minimo

[11] Patent Number: 4,889,171
[45] Date of Patent: Dec. 26, 1989

[54] FOLDABLE WEATHER CANOPY FOR MOTOR VEHICLES

[76] Inventor: Ruben M. Minimo, 25802 Hundson Ct., Loma Linda, Calif. 92354

[21] Appl. No.: 77,114

[22] Filed: Jul. 22, 1987

[51] Int. Cl.$^4$ ............................................. B60J 11/00
[52] U.S. Cl. ................................... 150/166; 296/95.1; 160/368.2; 160/DIG. 4
[58] Field of Search .................. 150/52 K; 160/368 S, 160/DIG. 4; 296/95 R, 95 C

[56] References Cited

U.S. PATENT DOCUMENTS

| | | |
|---|---|---|
| 1,252,766 | 3/1916 | Anderson . |
| 1,307,437 | 3/1918 | Curry . |
| 1,944,696 | 10/1933 | Reichl . |
| 2,305,677 | 2/1942 | Cotton ..................................... 296/97 |
| 2,599,015 | 4/1950 | Pritchard ............................... 296/44 |
| 2,620,007 | 12/1952 | Keller ..................................... 150/52 K |
| 2,646,097 | 7/1953 | Gaverth et al. ....................... 150/52 K |
| 2,716,433 | 8/1955 | Rawlings ............................... 150/52 K |
| 2,806,809 | 8/1955 | Schuh . |
| 2,950,749 | 8/1960 | McDonald ............................ 150/52 K |
| 3,192,784 | 3/1963 | Cayton . |
| 3,763,908 | 10/1973 | Norman ................................. 150/52 K |
| 3,785,697 | 1/1974 | Dabbs ................................... 150/52 K |
| 4,202,396 | 5/1980 | Levy ..................................... 160/107 |
| 4,209,197 | 6/1980 | Fischer ................................. 150/52 K |
| 4,531,560 | 7/1985 | |
| 4,589,459 | 5/1986 | . |
| 4,596,418 | 11/1985 | Koh ....................................... 296/136 |

FOREIGN PATENT DOCUMENTS

| | | | |
|---|---|---|---|
| 1139974 | 2/1957 | France .............................. | 150/52 K |
| 45-31207 | 12/1970 | Japan ................................ | 150/52 K |
| 54-23706 | 8/1979 | Japan ................................ | 150/52 K |
| 56-8729 | 2/1981 | Japan ................................ | 150/52 K |
| 1003621 | 9/1965 | United Kingdom ............. | 150/52 K |

OTHER PUBLICATIONS

4653797—Nov. 13, 1985—Chang V. Tran—Sun Screen For Interior Auto Window.
467489—Feb. 13, 1986—Sheldon Watjer, Ronald Dykstra—Sunshield System.
4652039—Nov. 5, 1985—Roger Richards—Windshield Shade.
4647102—Mar. 3, 1986—Mozaffar Ebrahimzadeh—Windshield Curtain.
4607875—Dec. 10, 1984—Kermit McGirr—Detachable Sunscreen for Veh. Windows.

Primary Examiner—William Price

[57] ABSTRACT

A collapsible protective canopy useful as both a sunshade and frostshield for motor vehicles is made of a sheet of corrugated cardboard, laminated cardboard, vinyl, leather, nylon, plastic, synthetic, or combinations thereof, or any other material in which fold line impressions, indentations or creases can be made to define parallel folds which can be stretched and compressed like the bellows of an accordion, the sheet including a center portion and two side portions provided with belts on opposite ends of the sheet for securing the canopy to a car body. The sheet is alternately foldable to a compact package for convenient handling and storage.

8 Claims, 5 Drawing Sheets

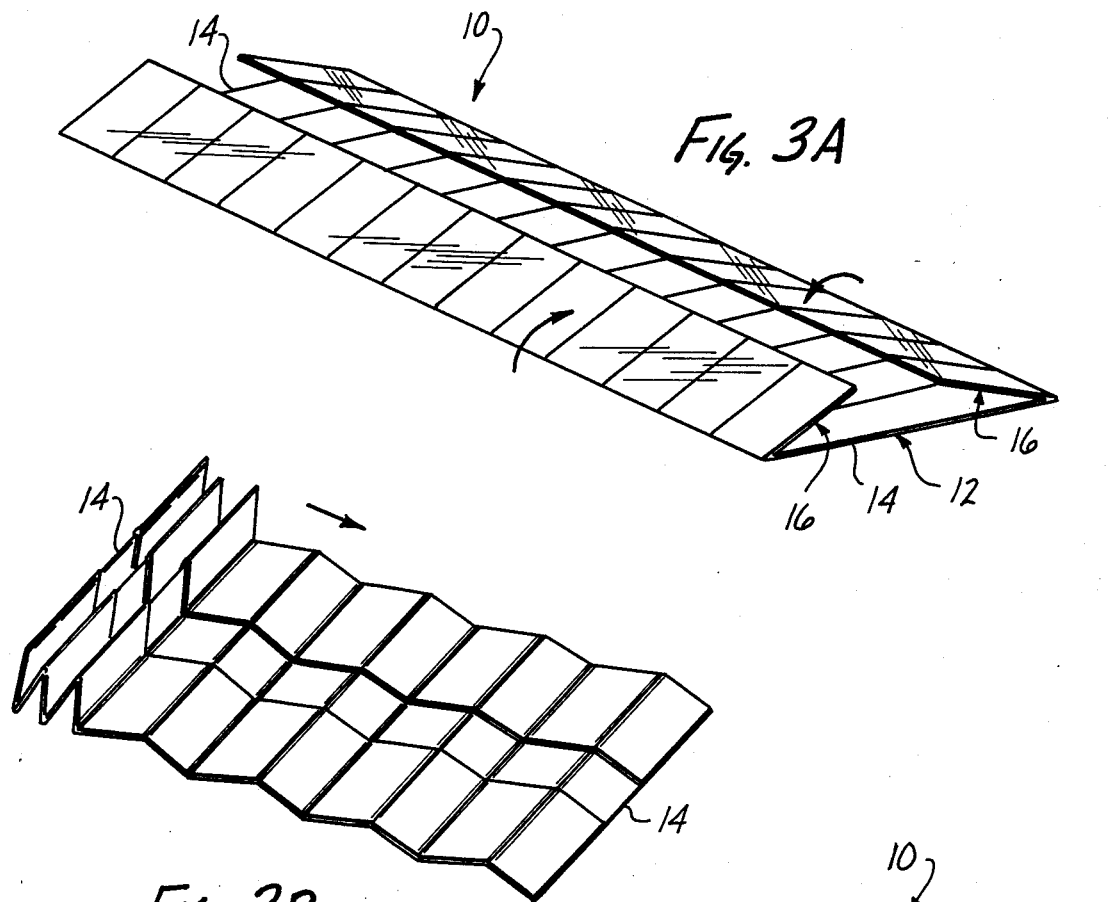
Fig. 3A
Fig. 3B
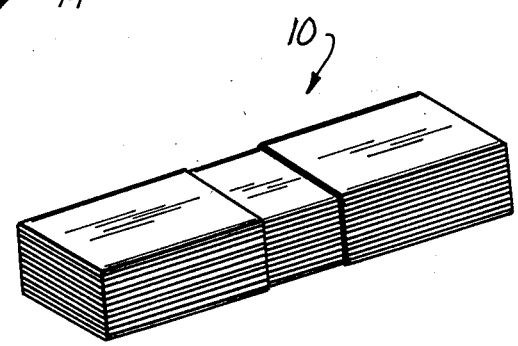
Fig. 3C
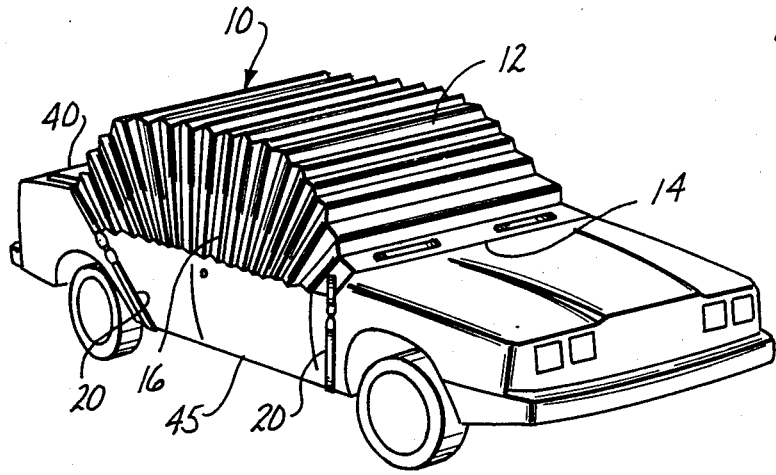
Fig. 4

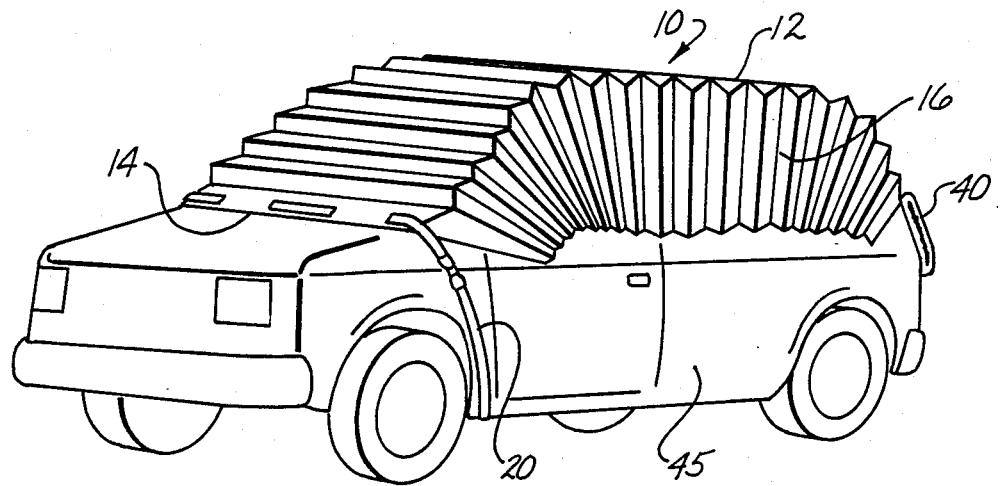
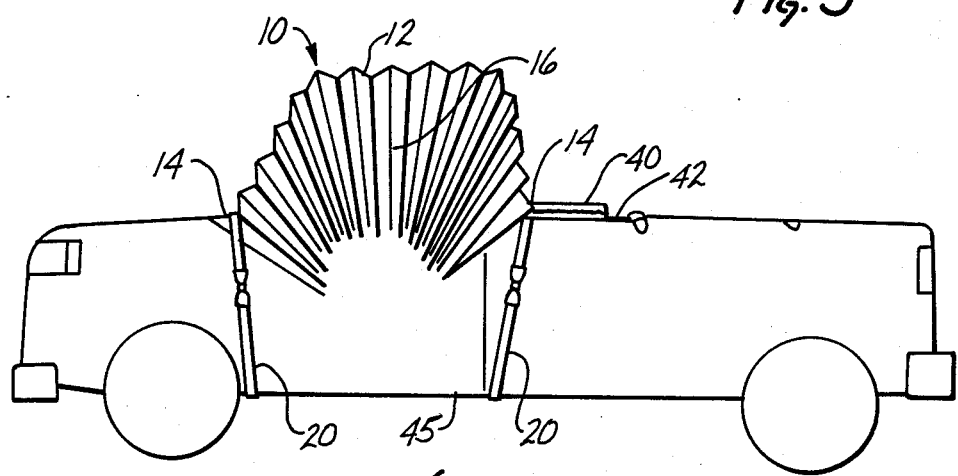
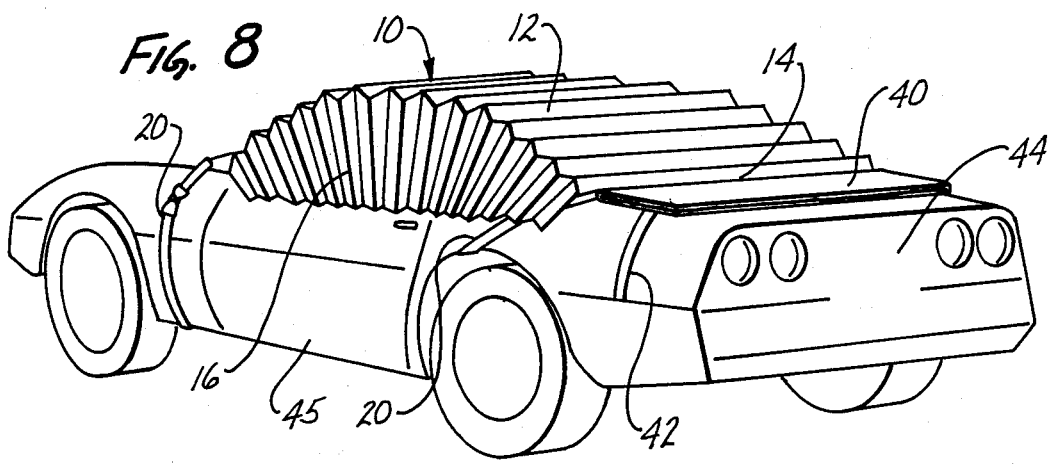

FOLDABLE WEATHER CANOPY FOR MOTOR VEHICLES

BACKGROUND OF THE INVENTION

1. Field of the Invention

This invention relates to protective covering for motor vehicles and more particularly to motor vehicle coverings which on hot days will serve as a sun shield to prevent direct sun exposure of the motor vehicle roof and windows thereby reducing heat build-up inside the car, protecting the motor vehicle and maintaining comfort. On cold, snowy days, the protective canopy reduces frost build-up on the windshield and windows, saving time and effort normally required to scrape and clean them. The cover also offers protection against slight snow build-up on the roof top which can be easily flipped away.

2. State of the Prior Art

No vehicle cover in current use is truly effective both as a sunshield and a frostshield, and proposed devices are too cumbersome and inconvenient for everyday use. While many automotive sun shields are known, these were never intended for use as frostshields. U.S. Pat. No. 2,599,014 to G. A. Pritchard proposes a weather covering fastened over the automobile windows but fails to protect the roof top against penetration of solar radiation and heat. Such coverings at best offer marginal protection and are therefore of limited value.

Available sunshields may be classified as those for either exterior or interior use, and those for use in a moving or a parked motor vehicle.

Interior sunshields are inadequate for reducing heat build-up inside motor vehicles because no attempt is made to block solar radiation before it reaches the motor vehicle windows and roof. Heat penetrates the windows and roof of motor vehicles, and once inside the passenger compartment it cannot be effectively abated by an indoor sunshield because the sunshield ineffectually deflects heat which is already inside the car. Sunshields such as proposed in U.S. Pat. No. 2,305,677 to A. P. Cotton and in U.S. Pat. No. 4,202,396 to Abraham Levy fall in this category. They are designed to cut glare and sun rays coming through the windows of a motor vehicle. No attempt is made to block sun rays exteriorly to the windows, and none at all to thwart heat penetration through the roof.

Known coverings and devices for exterior use include an arcuate semi-transparent cover mounted to the upper portion of the front window, which partially shades the interior of the car but only while the sun is high in the sky. U.S. Pat. No. 1,252,766 to J. R. Anderson, U.S. Pat. No. 1,307,437 to J. F. Curry, U.S. Pat. No. 1,944,696 to E. Reiehl, and U.S. Pat. No. 2,806,809 to C. H. Schuh, all fail to teach or suggest an effective sunshield for a motor vehicle. U.S. Pat. No. 3,192,784 to R. J.Cayton discloses a vertical blind which is inconvenient for use in motor vehicles because of its bulk and its mounting which partially blocks the driver's field of vision. Other devices of this type are also too bulky and without provision for easy storage when not in use. U.S. Pat. Nos. 4,596,418, 4,589,459 and 4,531,560, claim motor vehicle covers for protection against scratching, scraping and/or against dust, but are not intended for providing shade to the car.

This invention's primary purpose is both to provide shade for the car when parked outside for long hours, and to serve as a frostshield on cold days. Secondarily, it can serve as protection against dust and accidental scraping and scratching for those parts of the vehicle which it covers, namely the roof and windows of the passenger compartment.

It is one object of this invention to provide a shade, a sunshield, a frostshield, and a cover for motor vehicles while parked outside with the following advantages:

1. Direct sun rays are effectively blocked before reaching the roof and windows of motor vehicles.
2. Heat build-up inside the motor vehicle is reduced, maintaining comfort for longer time periods.
3. Comfort inside the car is restored more easily and quickly after prolonged exposure to hot sun. By opening the windows for ventilation or turning on the air conditioning, it is easier to lower the temperature inside the vehicle because heat accumulation is reduced.
4. Protects the car seat, dash board, instrument panel, and steering wheel more effectively and prevents searingly hot steering wheel and seat.
5. When unfolded, the parallel folds of the novel canopy form corrugations which greatly enhance its ability to repel heat as compared to a cover spread flat on the surface of the vehicle body. Furthermore, the folds make it easy to store the protective canopy into a rear-mounted container or bag following use.
6. On cold, snowy days, when parked outdoors this invention will reduce frost build-up on the windshield and windows, eliminating the expenditure of time and effort otherwise needed to scrape it off.
7. Finally, this invention can protect the roof, windows, and all other portions of a motor vehicle covered by the novel canopy against dust and scratches.

Still further objects and advantages of my invention will become apparent from the attached drawings and the following description.

BRIEF DESCRIPTION OF THE DRAWINGS

FIG. 3A shows in perspective view a firs stage in folding the flat canopy sheet for storage;

FIG. 3B shows a second stage illustrating the longitudinal folding of the canopy sheet for storage;

FIG. 3C shows the canopy sheet folded to its compact configuration for storage;

FIG. 4 shows in perspective the canopy installed and deployed on a typical passenger automobile;

FIG. 5 shows in perspective the canopy installed and deployed on a typical small van type vehicle;

FIG. 6 shows in perspective the canopy installed and deployed on a typical pick-up truck type vehicle;

FIG. 8 shows in perspective the canopy installed and deployed on a typical sports styled automobile;

DETAILED DESCRIPTION OF THE PREFERRED EMBODIMENTS

Figure 1:
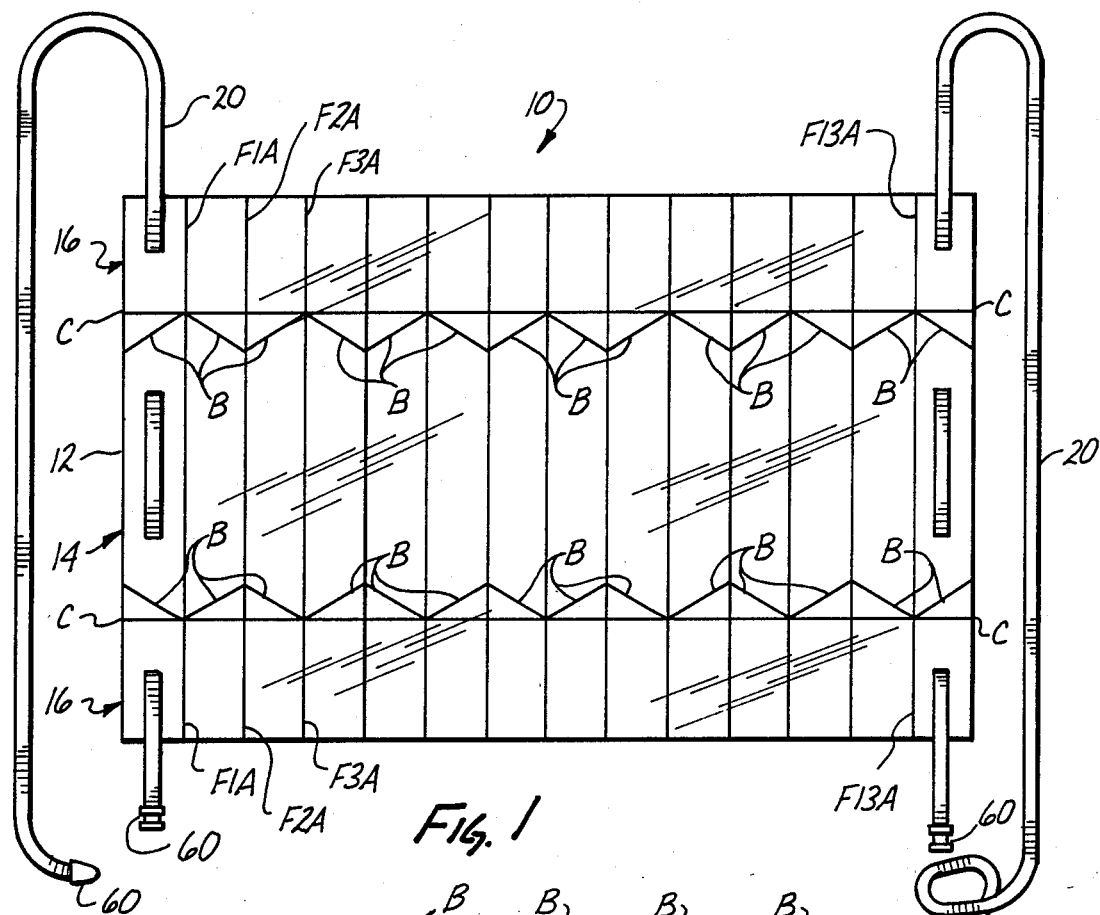
FIG. 1 is a plan view of the canopy sheet laid flat showing the crease or fold lines formed therein.

FIG. 1 shows a canopy 10 according to the preferred embodiment of my invention. Sheet material of corrugated cardboard, laminated cardboard, vinyl, leather, nylon, plastic, synthetic, or combinations thereof, or any other material in which fold line impressions, indentations or creases can be made has been processed to form therein indentations or creases constituting fold lines defining various panel elements comprising the structure of the invention, to define parallel folds which can be stretched and compressed like the bellows of an accordion.

With reference to FIG. 1, the foldable canopy 10 of this invention is a rectangular sheet which is longitudinally divided by two sets of crease lines, including one pair of parallel straight crease lines C and two longitudinal sawtooth shaped crease lines B, into a center section 12 extending between two opposite ends 14 of the sheet 10, and two side sections 16. Central section 12 is the canopy portion which rests on and covers the windshield, the roof top, and the rear window of a protected vehicle body. Lateral sheet sections 16 which also extend between the opposite sheet ends 14 are the two side sections which drop down on each side of the center section 12 to cover the side windows of the protected vehicle. Belts or ropes 20 at each end 14 are used to secure the canopy 10 to the body of a motor vehicle.

Figure 2:
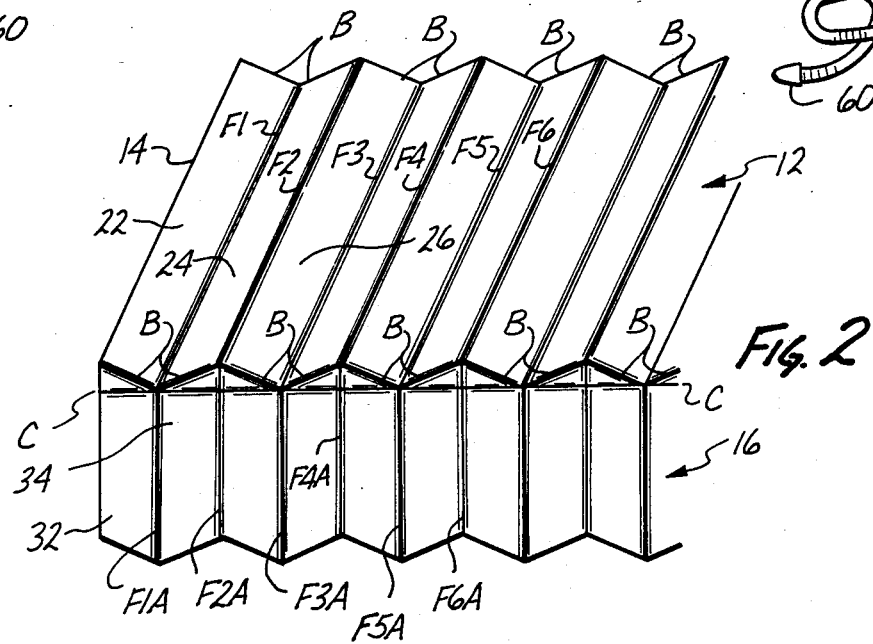
FIG. 2 is a fragmentary perspective view of the canopy sheet in its deployed form showing the accordion or bellowlike corrugations.

As shown in FIGS. 1 and 2, (FIG. 2 only shows the center section 12, and one side section 16) transverse folds F1, F2, F3, F4, through F13 are equally spaced from and parallel to each other, and perpendicular to the longitudinal fold lines C. Fold F1$_A$ on each side section 16 is a continuation of Fold 1 on center section 12, Folds F2$_A$ are a continuation of Fold F2, Fold F3$_A$ of Fold F3, and so on. Necessarily, folds F1$_A$, F2$_A$, F3$_A$, F4$_A$, and so on are likewise equally spaced and parallel to each other. where Fold F1 meets the sawtooth Fold B, Fold F1$_A$ begins, where Fold F2 meets the Fold B, Fold F2$_A$ starts, and so on. The transverse parallel folds and the two zigzag longitudinal folds B are arranged so that when the canopy 10 is spread on top of a motor vehicle body, Folds B allow the side sections 16 to drop at an angle to the center section 12, and come to rest in a position such as to cover the side windows of the motor vehicle. The sawtooth folds B cooperate with the transverse folds F1–F13 and lateral extension folds F1A–F13A to define bellow corrugations as shown in FIG. 2 where center panel 22 is at an angle relative to side panel 32, fold F1$_A$ at an angle relative to fold F1, center panel 24 at an angle relative to side panel 34, Fold F2$_A$ at an angle relative to Fold F2, and so on. Furthermore, Fold F1 tends to twist center panel 22 relative to center panel 24 in a clockwise direction whereas Fold F2 twists center panel 24 relative to center panel 26 in a counterclockwise direction, and so forth. At the same time, fold F1$_A$ on the side section 16 twists side panel 32 relative to side panel 34 in a counterclockwise direction, and Fold F2$_A$ twists side panel 34 relative to side panel 36 in a clockwise direction, and so forth. The result is that the canopy sheet 10 may be folded-up longitudinally like a fan into a relatively small package for convenient storage or easily spreadout like the bellows of an accordion with folds F1, F2, F3, F4, and so on alternately forming the high and low edges of the bellow corrugations. When Fold F1 is the low edge of a corrugation on the center section 12, its lateral continuation, Fold F1$_A$ is the high edge of the corresponding corrugations in the side sections 16; Fold F2 then becomes the high edge of the corrugation on center section 12, and Fold F2$_A$ the low edge on the side sections 16, and so on. From the foregoing it will be seen that the transverse folds F1–F13, F1A–F13A cooperate with the two longitudinal sawtooth folds B such that the side sections may drop dow at an angle to the center section with the center 12 only partially extended and the panels 22, 24 etc. at angles to each other defining accordionlike corrugations. in such case, the side portions also form accordionlike corrugations and the entire sheet 10 thus defined a longitudinally stretchable or collapsible canopy. Furthermore, it can be seen that the canopy 10 can readily assume almost any curvature or contour in its longitudinal direction so as to easily conform to the shape, rooftop curvature and rooftop length of many different vehicle body styles and shapes, as is illustrated in each of FIGS. 4, 5, 6, and 8.

For storage, the canopy sheet 10 is laid flat as shown in FIG. 1, and the two side sections 16 are folded over flat onto the flat central section 12 as shown in FIG. 3A along corresponding straight line longitudinal Folds C instead of the sawtooth lines B. The entire canopy sheet 10 can then be folded up or collapsed longitudinally as if compressing the bellows of an accordion, as suggested in FIG. 3B, to a generally rectangular, compact package having the length and width of one center panel, e.g. panel 22, and a height determined by the aggregate thickness of the folded and collapsed sheet 10 as shown in FIG. 3C. This package can then be easily and conveniently handled and placed into a suitable container or bag.

FIGS. 4, 5, 6 and 8 show the presently preferred embodiment of the protective canopy 10 installed on different types of vehicles. The canopy 10 is appropriately stretched to follow the contour of the particular motor vehicle with consecutive fold edges of the bellow corrugations alternately touching and spaced away from the underlying motor vehicle body. The belts or ropes 20 loop around the car body 45 along each side and underneath the car where its two free ends 60 meet and interlock with each other. The belts 20 may be sewed, glued, laminated, stapled, threaded through eyelets, or otherwise fastened to the canopy sheet 10, one belt about the front end 14 and the other belt 20 about the rear end 14 of the canopy sheet 10.

The rear belt 20 may also serve to secure to the vehicle body a suitable zippered storage container or bag 40 for the canopy 10. The bag 40 has an additional belt 42 which is looped or tied under the trunk lid 44 of the vehicle where appropriate, or tied to the cargo tie hooks typically found on the pick-up bed of small trucks as in FIG. 6.

Figure 9:
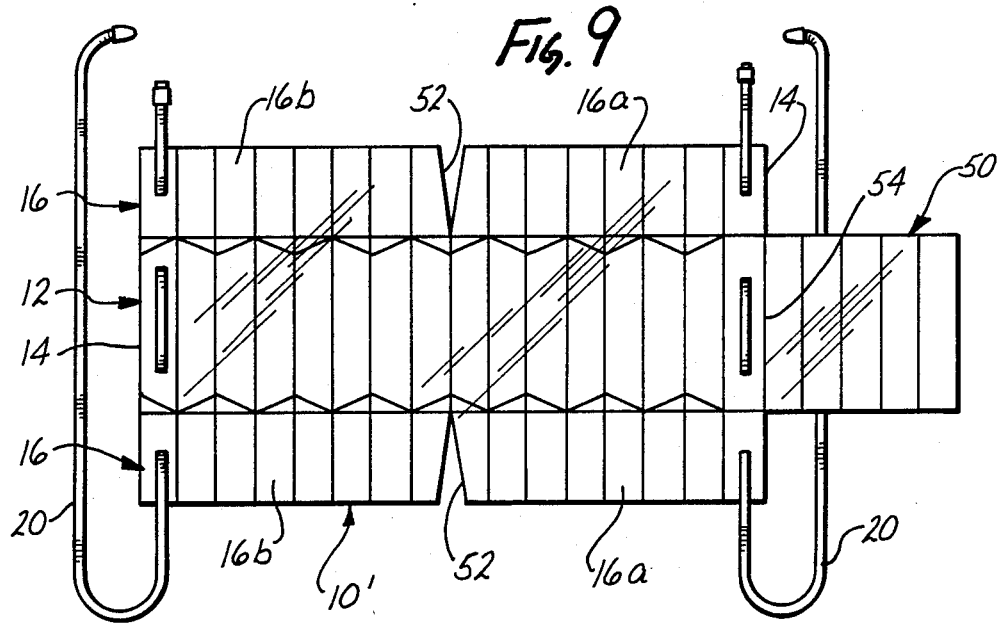
FIG. 9 shows in plan view a modified embodiment of the canopy sheet laid flat to show the crease or fold lines.

FIG. 9 shows the preferred embodiment of my invention modified by addition of a flip panel section 50 to the front end 14 of canopy sheet 10' particularly for use in cold, snowy climates, and further modified by division of the side sections 16 into subpanels 16a and subpanels 16b by a transverse cut 52 in each side section 16.

Figure 9A:
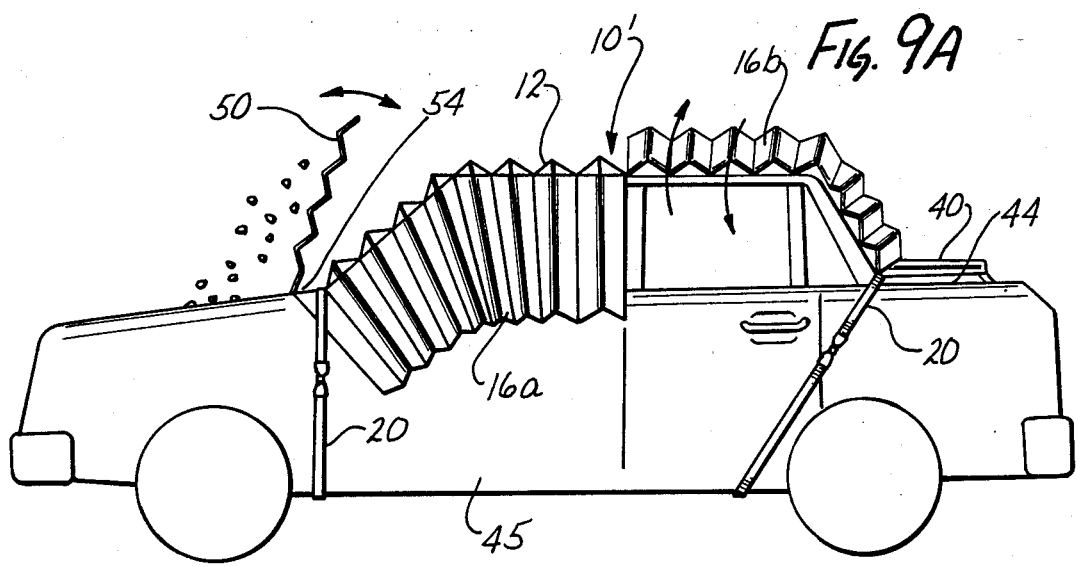
FIG. 9A is a side view of the modified embodiment of FIG. 9 installed and deployed on a typical automobile body and indicating the movable portions of the canopy for removal of snow accumulations.

FIG. 9A shows the modified embodiment of FIG. 9 installed on a typical passenger vehicle body 45, illustrating how the added section 50 hinges along Fold line 54 relative to the center section 12 and can be lifted in a clockwise position in the drawing and brought to rest on the portion of the center section 12 which lies over the vehicle's windshield. The left and right (only left side seen in FIG. 9A) forward subpanels 16a lie against and cover the driver's side window and the front passenger's side window respectively. The left and right rear subpanels 16b can hinge upwardly along Fold B to rest on the top portion or center section 12 of the canopy. After use, accumulated snow can be easily removed by flipping extension panel 50 and subpanels 16b away from the car. Any snow still remaining can then be shaken off the top before collapsing the canopy into its container bag 40. If the snow accumulation is too heavy, conventional scraping or shoveling devices may be resorted to.

OPERATION

Figure 7:
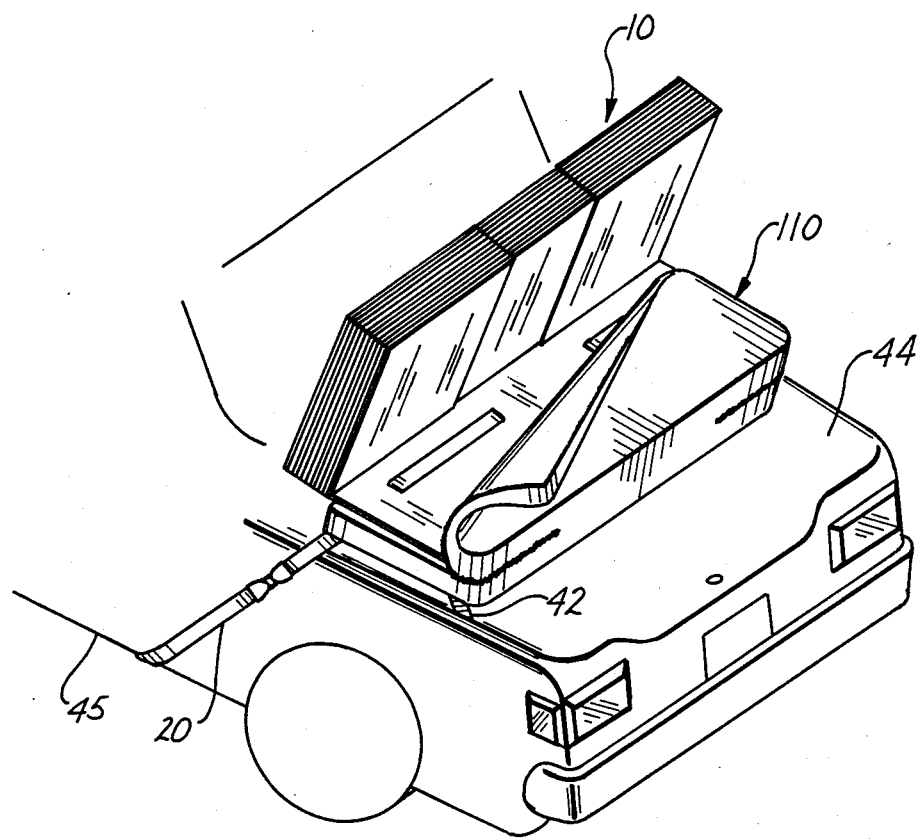
FIG. 7 illustrates the installation of the canopy storage bag on the trunk deck of a typical automobile body.

The container bag 40 containing the folded canopy 10 is laid on top of the trunk deck of the vehicle near the base of the vehicle's rear window as best seen in FIGS. 7 and 8. The long rear belt 20 is secured to the car body 45 with the belt looping around the underside of the car body just in front of the rear wheel, and the two free ends of the belt are locked together. The trunk lid 44 is then lifted and the additional belt of the bag 40 is looped or tied under the trunk lid, which is then closed; the container 40 should then fit neatly on top of the trunk deck of the vehicle. Buckles are provided for use in adjusting the various canopy belts.

To unfold the canopy 10, the container bag 40 is unzipped, allowing the free end 14 of the canopy sheet 10 to pop out. Holding this free end, the sheet 10 is pulled towards the front end of the vehicle body 45, stretching the canopy sheet away from the base of the windshield. This forward end of the canopy sheet is secured to the vehicle body with a front belt 20 similar to the belt 20 provided for the rear end of the sheet 10. The front belt 20 should again loop underneath the car body just behind the front wheel, the two ends of the belt locking together. The side sections 16 of the canopy sheet 10 should drop to cover the side windows. After use, the front belt 20 is unlocked and the aforementiond procedure is reversed, returning the canopy sheet to its collapsed, packaged condition, and the bag 40 is zippered closed with the folded canopy 10 inside. The bag 40 with the folded canopy may remain attached to the rear of the car body until after the harsh season is over and the protection of the canopy is no longer needed.

CONCLUSION AND SCOPE

The collapsible canopy of this invention provides a practical and economical device that can be easily used on practically any conventional motor vehicle. It is easy to use and maintain, affording great convenience to the motoring public. For example, on occasions when one is forced to wait or stay in a car for a couple of hours under hot sun with no shade trees in the vicinity, the shade that this device can provide will be a great relief. Moreover, for those who park their cars outdoors while at work, getting back into the car at the end of the day is made much easier and more comfortable by this invention because heat inside the car is greatly reduced. Furthermore, in cold climates, where often so much time is expended and effort exerted to scrape the windshield and rear windows of frost after a hard day's work, this device will greatly reduce the need to do so.

Figure 10:
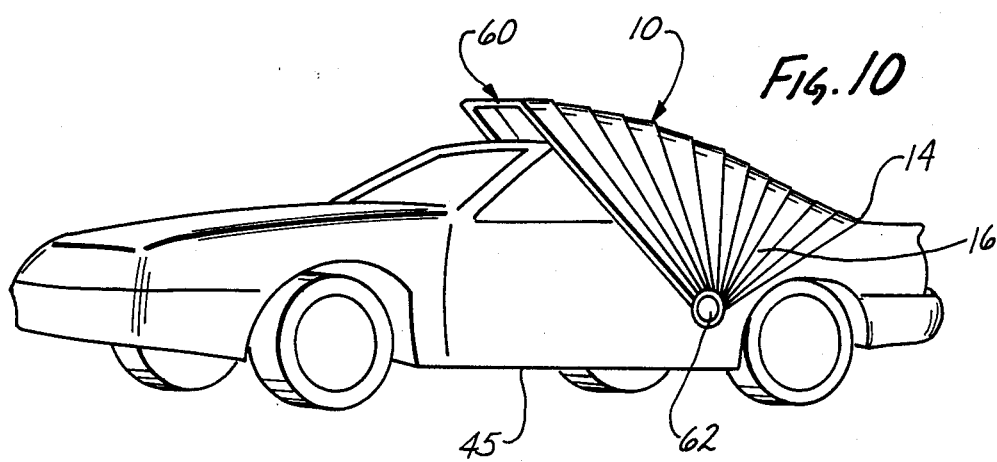
FIG. 10 is a perspective view of the novel canopy provide with a rigid supporting frame pivotable for deploying or collapsing the canopy over a vehicle body.

While my above description contains many particular details, these should not be construed as limitations on the scope of the invention, but rather as an example of one preferred embodiment thereof. Many variations are possible. For example, as shown in FIG. 10 it is possible to provide a rigid tubular support frame 60, such as cylindrical chrome pipe or a cylindrical stainless pipe, bent to a U-shape, and dimensioned to span the car body 45 along one side, over the roof top and then along the other side. On each end of this pipe is provided a pivot device 62 which gathers together the entire side edge of the canopy sheet 10 as seen in FIG. 10 and also secures the entire canopy to the sides of the car body 45, allowing the U-shaped support frame 60 to be pivoted back and forth like an inverted pendulum, i.e. swung forward and backward over the vehicle body 45 to conveniently deploy and collapse the protective canopy 10. One end of a canopy sheet 10 such as already described, or of an accordion styled rectangular planar board, or any other material configured as a bellows of an accordion, can be attached to this device deployment so that it will open and close, e.g., to cover and uncover the car as needed.

Various additional cuts may be made in the canopy sheet 10 which will change or increase the versatility of the device. Addition of a simple rod will hold the seams or edges of the canopy up high enough to allow air and light inside while waiting in the car. One end of such a rod will hold the seams of the canopy through an eyelet, and the other end will rest on the car. In another possible variation the canopy may be dimensioned to cover the entire motor vehicle, rather than only the roof and windows, to protect the entire car body against the weather.

Many other uses will be found for the collapsible canopy of this invention other than protecting motor vehicles. If constructed in proper sizes and with provision of additional supporting elements such as camping tent rods and frames, this canopy could be fashioned to be a sunshade for a camping tent, so that in the absence of shade trees, a tent can be shaded in much the same fashion as has been described for a vehicle, reducing heat build-up inside a tent, to maximize comfort of the occupants.

The canopy sheet 10 need not have folds if other ways can be devised to provide air spaces distributed between the canopy sheet and the underlying car body. The folds also need not all be like the bellows of an accordion. Eggcrate patterns or compressions and depressions of other designs may be provided. Additional belts and ropes may also be provided throughout the device as may be desirable to properly and conveniently secure the canopy sheet to a motor vehicle.

I claim:

1. A protective covering for a motor vehicle comprising:
   a sheet of creasable material having a longitudinal dimension between two ends;
   a pair of straight parallel longitudinal creases connecting said ends and dividing said sheet longitudinally into a center and two side portions;
   a plurality of transverse creases perpendicular to said parallel creases oriented in alternating directions for facilitating the folding of said sheet into an accordion stretchable in length; and
   sawtooth fold means along each of said longitudinal creases enabling said side portions to be folded at a right angle to said center portion while retaining said accordion folding in a transverse direction;
   whereby said sheet may be alternately formed into a protective canopy of variable length and adjustable curvature in a longitudinal direction, or folded with said side portions folded onto said center protion and all three of said portions then longitudinally collapsed in accordion fashion for storage to a compact package having a maximum dimension equal to the width of said center section, a width equal to the spacing between said transverse folds, and a height determined by the aggregate thickness of the collapsed sheet.

2. The protective cover of claim 1 further comprising means for securing each of said sheet ends to the body of a vehicle.

3. The protective cover of claim 2 wherein said means for securing include belt means attached to each said end of sufficient length to loop underneath a typical automobile body and thus secure the sheet over that body.

4. The protective cover of claim 3 wherein said means for securing include a single belt at each said end, each said belt being threaded through corresponding openings in said side portions and said center portions.

5. The protective cover of claim 2 further comprising cover storage bag means attached at one of said sheet ends and having means for securing said storage bag to an automotive body so as to receive and enclose said sheet when folded from the opposite of said ends into said compact package for storage into said container means.

6. The protective cover of claim 1 further comprising transversely creased flip panel means extending longitudinally from said sheet, said flip panel means being foldable over said center portion while said canopy is installed on a vehicle such that accumulations of snow or the like may be quickly shaken off said sheet by lifting said flip panel away from said center portion, said flip panel being longitudinally collapsible in accordion fashion together with said center portion.

7. The protective cover of claim 5 wherein each said side portion is divided into lateral subpanels independently foldable onto said center section for providing access to portions of a vehicle on which may be installed said sheet.

8. The protective cover of claim 1 further comprising a generally U-shaped rigid supporting frame attached to one end of said sheet said sheet being longitudially gathered along its side edges and secured to pivot elements on each end of said frame, the opposite end of said sheet being secured to a vehicle body, whereby said sheet may be spread open in fan-like fashion to form a canopy between said frame and said opposite end by swinging said frame on said pivot elements secured to the sides of an automotive body.

* * * * *